United States Patent
Jiang et al.

(10) Patent No.: US 11,102,760 B2
(45) Date of Patent: Aug. 24, 2021

(54) METHOD AND DEVICE IN UE AND BASE STATION FOR WIRELESS COMMUNICATION WITH IMPROVED HARQ DESIGN

(71) Applicants: Qi Jiang, Shanghai (CN); XiaoBo Zhang, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/833,706

(22) Filed: Mar. 30, 2020

(65) Prior Publication Data
US 2020/0229148 A1     Jul. 16, 2020

Related U.S. Application Data

(63) Continuation of application No. PCT/CN2019/071530, filed on Jan. 14, 2019.

(30) Foreign Application Priority Data

Jan. 29, 2018 (CN) .................. 201810083549.X

(51) Int. Cl.
*H04W 72/02* (2009.01)
*H04W 76/11* (2018.01)
(Continued)

(52) U.S. Cl.
CPC ........... *H04W 72/02* (2013.01); *H04W 24/08* (2013.01); *H04W 76/11* (2018.02); *H04W 92/10* (2013.01)

(58) Field of Classification Search
CPC ..... H04W 72/02; H04W 76/11; H04W 24/08; H04W 92/10; H04L 5/0014; H04L 5/0044; H04L 5/0007; H04L 5/0053
See application file for complete search history.

(56) References Cited

U.S. PATENT DOCUMENTS 10,666,334 B2* 5/2020 Xiong .................. H04L 5/0048
2012/0093116 A1   4/2012 Files et al.
(Continued)

FOREIGN PATENT DOCUMENTS

CN    102340831 A    2/2012
CN    104601304 A    5/2015
(Continued)

OTHER PUBLICATIONS

CN Search Report in application No. 201810083549.X dated Mar. 3, 2020.
(Continued)

*Primary Examiner* — Wei Zhao

(57) ABSTRACT

The present disclosure provides a method and a device in a User Equipment (UE) and a base station for wireless communication. The UE transmits a first radio signal in a first air-interface resource, and receives first information, the first information including first sub-information and second sub-information. The first air-interface resource belongs to a first air-interface resource subpool, and the first air-interface resource subpool belongs to a first air-interface resource pool; the second sub-information includes Q1 fields, and the second information is used for indicating whether a bit block transmitted in the first air-interface resource pool is correctly received; a first field is one of the Q1 fields, and a first bit is a bit in the first field which is used for indicating whether the first radio signal is correctly received. The present
(Continued)

disclosure indicates downlink feedback of grant-free uplink transmission through two levels of sub-information.

20 Claims, 15 Drawing Sheets

(51) Int. Cl.
  *H04W 24/08* (2009.01)
  *H04W 92/10* (2009.01)

(56) References Cited

U.S. PATENT DOCUMENTS

| | | | |
|---|---|---|---|
| 2016/0301459 A1 | 10/2016 | Grandhi | |
| 2020/0145079 A1* | 5/2020 | Marinier | H04B 7/0456 |
| 2020/0403751 A1* | 12/2020 | Baldemair | H04L 1/0027 |

FOREIGN PATENT DOCUMENTS

| | | |
|---|---|---|
| CN | 104811281 A | 7/2015 |
| CN | 106961743 A | 7/2017 |
| CN | 107347002 A | 11/2017 |
| WO | 2013180518 A | 12/2013 |
| WO | 2018008406 A1 | 1/2018 |

OTHER PUBLICATIONS

CN Office Action in Application No. 201810083549.X dated Mar. 11, 2020.
CN Notice of Granting Patent Right in Application No. 201810083549.X dated May 8, 2020.
"一种基于跨层反馈信息的下行 OFDMA 资源分配策略".
3GPP "Draft Report of 3GPP TSG RAN WG1 #91 V0.3.0".
ISR received in application No. PCT/CN2019/071530 dated Mar. 26, 2019.

* cited by examiner

METHOD AND DEVICE IN UE AND BASE STATION FOR WIRELESS COMMUNICATION WITH IMPROVED HARQ DESIGN

CROSS-REFERENCE TO RELATED APPLICATION

This application is a continuation of International Application No. PCT/CN2019/071530, filed on Jan. 14, 2019, claiming the priority benefit of Chinese Application No. 201810083549.X, filed on Jan. 29, 2018, the full disclosure of which is incorporated herein by reference.

BACKGROUND

Technical Field

The present disclosure relates to transmission methods and devices in wireless communication systems, and in particular to a method and a device for grant-free uplink transmission.

Related Art

In conventional 3rd Generation Partner Project (3GPP) Long-term Evolution (LTE) systems, when one same block of time-frequency resources is scheduled to different users, the different users usually prevent the occurrence of interference between each other through orthogonal code-domain resources or different multi-access signatures. In Release 13 and Release 14, on the basis of the constant improvement of processing capabilities of devices and the requirement about further improvement of spectrum efficiency, downlink data transmission introduces Non-Orthogonal Multi Access (NOMA) technologies to improve the spectrum efficiency.

At present, technical discussions of the 5G New Radio Access Technology (5G NR) are ongoing. One important feature of the 5G NR is to support multiple NOMA technologies in uplink transmission. Meanwhile, grant-free uplink transmission, due to features such as few overheads of control signalings and low time latency, will be studied in 5G in combination with the NOMA technologies.

SUMMARY

One important application scenario of the grant-free uplink transmission is that, when there are a large number of terminals potentially needing to be served under the coverage of a base station and the amount of data transmitted by the terminal is small, transmitting an independent grant for one time of transmission of each terminal will result in that a proportion of control signalings is much higher than a proportion of data in the system. Meanwhile, the introduction of NOMA technologies enables receivers to receive simultaneously multiple air-interface resources non-orthogonal in time-frequency domain and code-domain so as to further improve the spectrum efficiency. In order to guarantee the efficiency of the grant-free uplink transmission and to reduce the buffering size of terminal devices, the base station needs to transmit a corresponding downlink Hybrid Automatic Repeat request-Acknowledgement (HARQ-ACK) for the grant-free uplink transmission.

One simple design approach of HARQ-ACK is that the base station allocates a block of air-interface resources for each potential User Equipment (UE) to transmit a corresponding HARQ-ACK. However, the grant-free uplink data transmission has randomness and the base station does not know which UE will transmit uplink data. When there are a large number of potential UEs, the reserved HARQ-ACK resources will result in significantly great overheads of control signalings in the system, thus reducing the spectrum efficiency.

In view of the above problems, the present disclosure provides a solution. Embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for wireless communication, wherein the method includes:

transmitting a first radio signal in first air-interface resources; and receiving first information, the first information including first sub-information and second sub-information.

Herein, the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one embodiment, the above method is characterized in that: the Q1 fields in the second sub-information are used to indicate only the Q1 first-type air-interface resource subpools among the K2 first-type air-interface resource subpools on which the base station detects the occurrence of uplink transmission, thereby avoiding reserving HARQ-ACK bits for all first-type air-interface resources included in the first air-interface resource pool.

In one embodiment, the above method has the following benefits: when there are a large number of users performing grant-free uplink transmission in a cell served by a base station, the users are grouped through the first air-interface resource pool and the K2 first-type air-interface resource subpools. The base station indicates to the UE whether the first radio signal is correctly received, through a two-level indication mode of the first sub-information and the second sub-information. When there are a small number of users performing grant-free uplink transmission simultaneously, the two-level indication mode will reduce significantly the number of bits actually used to indicate HARQ-ACK, thereby avoiding that too many overheads are reserved for control signalings in the system.

According to one aspect of the present disclosure, the above method includes:

receiving third sub-information.

Herein, the third sub-information is used for determining a position of the first bit in the first field and a position of the first field in the Q1 fields.

In one embodiment, the above method has the following benefits: the base station predefines multiple grouping manners for the first air-interface resource pool, that is, division approaches of the K2 first-type air-interface resource subpools, and determines which grouping manner can centralize as far as possible all the first-type air-interface resources in which uplink transmissions are detected into a first-type air-interface resource subpool having a relatively small number of air-interface resources, depending on radio signals detected in the first air-interface resource pool. Thus, the size of Q1 is effectively reduced. As a consequence, the signaling overhead occupied by the second sub-information is further reduced.

According to one aspect of the present disclosure, the above method includes:

transmitting a second radio signal in second air-interface resources.

Herein, the second radio signal is used for indicating a first identification, and the UE corresponds to the first identification.

In one embodiment, the above method has the following benefits: the UE identifies itself to the base station through the first identification, to ensure that the base station, when receiving the first radio signal, knows that the first radio signal is transmitted by the UE. This approach improves the robustness of the grant-free transmission.

According to one aspect of the present disclosure, the above method includes:

receiving second information.

Herein, the second information is used for indicating a second air-interface resource pool, the second air-interface resource pool includes K3 second-type air-interface resources, and the first identification is used for determining the second air-interface resources from the second air-interface resource pool.

In one embodiment, the above method has the following benefits: by establishing a relationship between the first identification and the second air-interface resources, the base station can acquire the identification of the UE more easily.

In one embodiment, the above method has another benefit as follows: when the K3 second-type air-interface resources are orthogonal in at least one of time, frequency and code domains the above method can improve the performance of the base station detecting the identification of the UE, thereby guaranteeing the performance of the grant-free uplink transmission.

In one embodiment, the above method has another benefit as follows: the second radio signal may be used for a Demodulation reference Signal (DMRS) of the first radio signal, and the performance of reception of the first radio signal may be further improved based on a configuration of K3 orthogonal second-type air-interface resources.

According to one aspect of the present disclosure, the above method includes:

receiving third information.

Herein, the third information is used for indicating the first air-interface resource pool.

The present disclosure provides a method in a base station for wireless communication, wherein the method includes:

monitoring a first radio signal in first air-interface resources; and transmitting first information, the first information including first sub-information and second sub-information.

Herein, the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

According to one aspect of the present disclosure, the above method includes:

transmitting third sub-information.

Herein, the third sub-information is used for determining a position of the first bit in the first field and a position of the first field in the Q1 fields.

According to one aspect of the present disclosure, the above method includes:

monitoring a second radio signal in second air-interface resources.

Herein, the second radio signal is used for indicating a first identification, and a transmitter of the first radio signal corresponds to the first identification.

According to one aspect of the present disclosure, the above method includes:

transmitting second information.

Herein, the second information is used for indicating a second air-interface resource pool, the second air-interface resource pool includes K3 second-type air-interface resources, and the first identification is used for determining the second air-interface resources from the second air-interface resource pool.

According to one aspect of the present disclosure, the above method includes:

transmitting third information.

Herein, the third information is used for indicating the first air-interface resource pool.

The present disclosure provides a UE for wireless communication, wherein the UE includes:

a first transceiver, to transmit a first radio signal in first air-interface resources;

and a first receiver, to receive first information, the first information including first sub-information and second sub-information.

Herein, the first air-interface resource is a first-type air-interface resource in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one embodiment, the above UE for wireless communication is characterized in that: the first receiver further receives third sub-information; and the third sub-information is used for determining a position of the first bit in the first field and a position of the first field in the Q1 fields.

In one embodiment, the above UE for wireless communication is characterized in that: the first transceiver further transmits a second radio signal in second air-interface resources; and the second radio signal is used for indicating a first identification, and the UE corresponds to the first identification.

In one embodiment, the above UE for wireless communication is characterized in that: the first transceiver further receives second information; and the second information is used for indicating a second air-interface resource pool, the second air-interface resource pool includes K3 second-type air-interface resources, and the first identification is used for determining the second air-interface resources from the second air-interface resource pool.

In one embodiment, the above UE for wireless communication is characterized in that: the first transceiver further receives third information; and the third information is used for indicating the first air-interface resource pool.

The present disclosure provides a base station for wireless communication, wherein the base station includes:

a second transceiver, to monitor a first radio signal in first air-interface resources; and a first transmitter, to transmit first information, the first information including first sub-information and second sub-information.

Herein, the first air-interface resources are a first-type air-interface resource in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one embodiment, the base station for wireless communication is characterized in that: the first transmitter further transmits third sub-information; and the third sub-information is used for determining a position of the first bit in the first field and a position of the first field in the Q1 fields.

In one embodiment, the base station for wireless communication is characterized in that: the second transceiver further monitors a second radio signal in second air-interface resources; and the second radio signal is used for indicating a first identification, and the UE corresponds to the first identification.

In one embodiment, the base station for wireless communication is characterized in that: the second transceiver further transmits second information; and the second information is used for indicating a second air-interface resource pool, the second air-interface resource pool includes K3 second-type air-interface resources, and the first identification is used for determining the second air-interface resources from the second air-interface resource pool.

In one embodiment, the base station for wireless communication is characterized in that: the second transceiver further transmits third information; and the third information is used for indicating the first air-interface resource pool.

In one embodiment, compared with conventional schemes, the present disclosure has the following benefits.

When there are a large number of users performing grant-free uplink transmission in a cell served by a base station, the users are grouped through the first air-interface resource pool and the K2 first-type air-interface resource subpools. The base station indicates to the UE whether the first radio signal is correctly received, through a two-level indication mode of the first sub-information and the second sub-information. When there are a small number of users performing grant-free uplink transmission simultaneously, the Q1 fields in the second sub-information are used to indicate only the Q1 first-type air-interface resource subpools among the K2 first-type air-interface resource subpools on which the base station detects the occurrence of uplink transmission. The two-level indication mode can reduce significantly the number of bits actually used to indicate HARQ-ACK, thereby avoiding that too many overheads are reserved for control signalings in the system.

The base station predefines multiple grouping manners for the first air-interface resource pool, that is, division approaches of the K2 first-type air-interface resource subpools, determines which grouping manner can centralize as far as possible all the first-type air-interface resources in which uplink transmissions are detected into a first-type air-interface resource subpool having a relatively small number of air-interface resources, depending on radio signals detected in the first air-interface resource pool, and then indicates the grouping manner to the UE through the third sub-information. Thus, the size of Q1 is effectively reduced. As a consequence, the signaling overhead occupied by the second sub-information is further reduced.

By establishing a relationship between the first identification and the second air-interface resources, the base station can acquire the identification of the UE more easily. When the K3 second-type air-interface resources are orthogonal in at least one of time, frequency and code domains the above method can improve the performance of the base station detecting the identification of the UE, thereby guaranteeing the performance of the grant-free uplink transmission. Meanwhile, the second radio signal may be used for a DMRS of the first radio signal, and the performance of reception of the first radio signal may be further improved based on a configuration of K3 orthogonal second-type air-interface resources.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
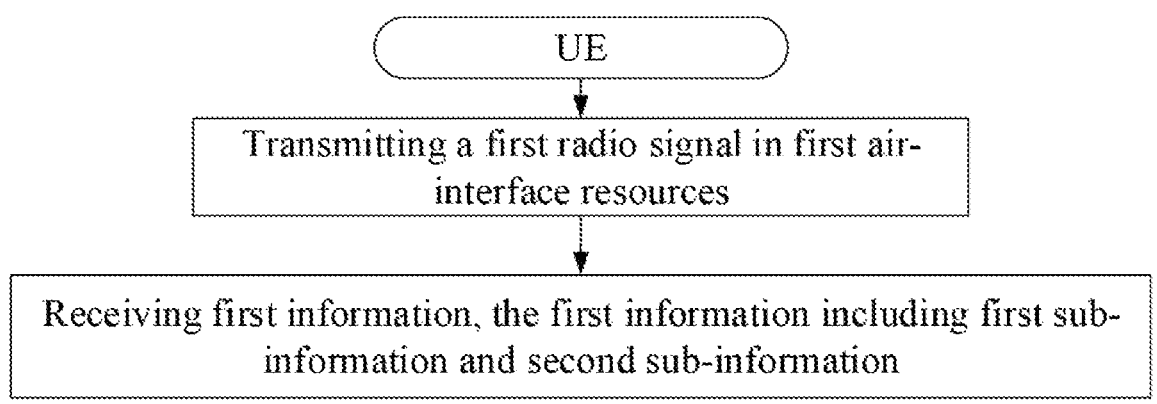
FIG. 1 is a flowchart of a first radio signal according to one embodiment of the present disclosure.

Embodiment 1 illustrates an example of a flowchart of a first radio signal, as shown in FIG. 1.

In Embodiment 1, the UE in the present disclosure first transmits a first radio signal in first air-interface resources, and then receives first information, the first information including first sub-information and second sub-information; the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the first sub-information and the second sub-information are cell-specific.

In one subembodiment, the first sub-information and the second sub-information are dynamically configured.

In one subembodiment, the first sub-information and the second sub-information belong to one DCI (Downlink Control Information).

In one subembodiment, the first sub-information and the second sub-information belong to two different DCIs.

In one subembodiment, the first sub-information is transmitted through a given DCI, and the second sub-information is a Physical Downlink Shared Channel (PDSCH) scheduled by the given DCI.

In one subembodiment, the first sub-information belongs to a Physical Downlink Control Channel (PDCCH), and a Cyclic Redundancy Check (CRC) included in the PDCCH is scrambled through a given Radio Network Temporary Identifier (RNTI); the given RNTI is cell-specific, or the given RNTI is terminal group-specific, and the UE belongs to the terminal group.

In one subembodiment, the second sub-information belongs to a PDCCH, and a CRC included in the PDCCH is scrambled through a given RNTI; the given RNTI is cell-specific, or the given RNTI is terminal group-specific, and the UE belongs to the terminal group.

In one subembodiment, the first air-interface resource pool consists of K3 first-type air-interface resources, and the K3 is an arithmetic product of the K1 and the K2.

In one subembodiment, the K1 and the K2 are both greater than 1.

In one subembodiment, each field of the Q1 fields includes K1 bits.

In one subembodiment, the number of bits included in each field of the Q1 fields is equal to the number of air-interface resources included in a corresponding air-interface resource subpool.

In one subembodiment, bits in any one field of the Q1 fields are one-to-one corresponding to air-interface resources in a corresponding air-interface resource subpool, and any one bit in the Q1 fields is used for indicating whether a signal transmitted in a corresponding air-interface resource is correctly received.

In one subembodiment, the first field includes K1 bits, and the K1 bits are used for indicating whether uplink transmissions on the K1 first-type air-interface resources included in the first air-interface resource subpool are correctly received, respectively.

In one subembodiment, the K1 is greater than 1, the first field includes a target bit only, and the target bit is used for indicating whether uplink transmissions on the K1 first-type air-interface resources included in the first air-interface resource subpool are correctly received.

In one affiliated embodiment of the above subembodiment, uplink transmissions on the K1 first-type air-interface resources included in the first air-interface resource subpool are all correctly received, and the target bit is equal to 1.

In one affiliated embodiment of the above subembodiment, among uplink transmissions on the K1 first-type air-interface resources included in the first air-interface resource subpool, the uplink transmission on one of the first-type air-interface resources is not correctly received, and the target bit is equal to 0.

In one subembodiment, each field of the Q1 fields includes the same number of bits.

In one subembodiment, at least two fields of the Q1 fields include different numbers of bits.

In one subembodiment, any one first-type air-interface resources in the first air-interface resource pool include time-frequency resources and multi-access signatures.

In one subembodiment, any one first-type air-interface resources in the first air-interface resource pool includes time-frequency resources and code-domain resources.

In one subembodiment, any one first-type air-interface resource in the first air-interface resource pool include first target air-interface resources and second target air-interface resources, the first target air-interface resources included in any two first-type air-interface resources in the first air-interface resource pool are orthogonal; and the first air-interface resource pool includes at least two first-type air-interface resources, where two second target air-interface resources included in the two first-type air-interface resources are non-orthogonal.

In one affiliated embodiment of the above subembodiment, the first target air-interface resources and the second target air-interface resources are reserved to a DMRS and a corresponding uplink channel respectively.

In one affiliated embodiment of the above subembodiment, the first target air-interface resources include time-frequency resources and multi-access signatures, and the second target air-interface resources include time-frequency resources and multi-access signatures.

In one subembodiment, two first-type air-interface resources are orthogonal only when at least one of the following conditions is met:
the two first-type air-interface resources are non-overlapping in time domain;
the two first-type air-interface resources are non-overlapping in frequency domain; and
the two first-type air-interface resources correspond to mutually orthogonal multi-access signatures in code domain.

In one subembodiment, two first-type air-interface resources are orthogonal only when at least one of the following conditions is met:
there is no Resource Element (RE) belonging to both the two first-type air-interface resources; and
the two first-type air-interface resources include a first sequence and a second sequence in code domain respectively, and the correlation between the first sequence and the second sequence is 0.

In one subembodiment, the first bit block consists of one of the bit blocks.

In one subembodiment, the bit block includes one Transport Block (TB).

In one subembodiment, the bit block includes a plurality of TBs.

In one subembodiment, the bit block includes one or more Code Blocks (CBs).

In one subembodiment, any one first-type air-interface resources in the first air-interface resource pool include first target air-interface resources and second target air-interface resources, and the first target air-interface resources contain one of the bit blocks in the present disclosure.

In one subembodiment, any one first-type air-interface resources in the first air-interface resource pool include first target air-interface resources and second target air-interface resources, and at least one first target air-interface resources in the first air-interface resources do not include the bit block in the present disclosure.

In one subembodiment, any one first-type air-interface resources in the first air-interface resource pool includes first target air-interface resources and a second target air-interface resource, and at least one first target air-interface resources in the first air-interface resources do not include a useful uplink radio signal.

In one subembodiment, the first radio signal is obtained after the first bit block experiences in sequence channel coding, modulation mapper, layer mapper, precoding, resource element mapper, and generation of multicarrier symbols.

In one subembodiment, the multicarrier symbol in the present disclosure is one of Orthogonal Frequency Division Multiplexing (OFDM) symbol, Single-Carrier Frequency Division Multiple Access (SC-FDMA) symbol, Filter Bank Multi Carrier (FBMC) symbol, OFDM symbol including Cyclic Prefix (CP), Discrete Fourier Transform Spreading Orthogonal Frequency Division Multiplexing (DFT-s-OFDM) symbol including CP.

In one subembodiment, the transmission of the first radio signal is contention based.

In one subembodiment, the transmission of the first radio signal is grant-free.

In one subembodiment, the transmission of the first radio signal is determined by the UE autonomously.

In one subembodiment, a receiver of the first radio signal determines through a blind detection manner whether the first radio is transmitted.

In one subembodiment, the blind detection in the present disclosure includes at least one of energy detection and signature sequence detection.

In one subembodiment, the first radio signal includes a CRC, and the blind detection includes a check for CRC.

In one subembodiment, the UE corresponds to a first identification.

In one affiliated embodiment of the above subembodiment, the first identification is a non-negative integer.

Embodiment 2

Figure 2:
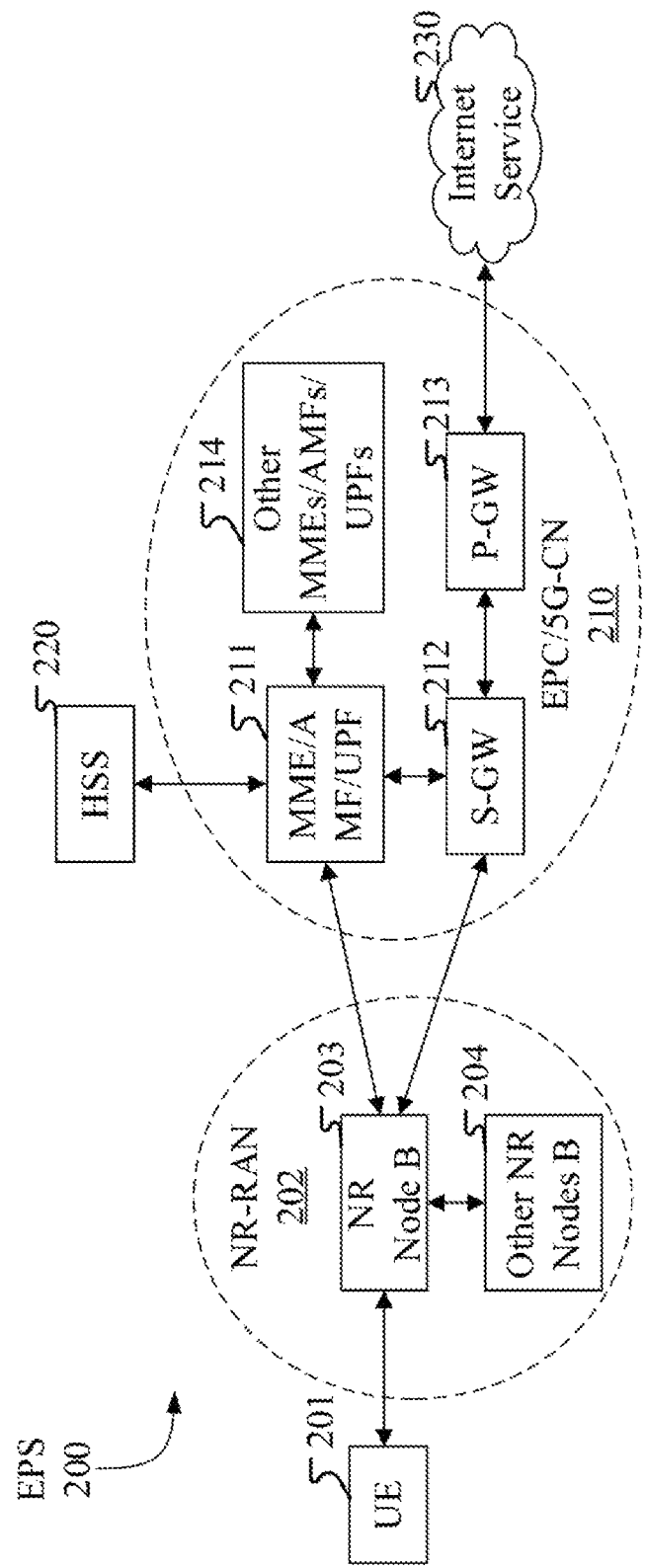
FIG. 2 is a diagram illustrating a network architecture according to one embodiment of the present disclosure.

Embodiment 2 illustrates an example of a diagram of a network architecture, as shown in FIG. 2.

Embodiment 2 illustrates an example of a diagram of a network architecture according to the present disclosure, as shown in FIG. 2. FIG. 2 is a diagram illustrating a network architecture 200 of NR 5G, Long-Term Evolution (LTE), Long-Term Evolution Advanced (LTE-A) systems. The NR 5G or LTE network architecture 200 may be called an Evolved Packet System (EPS) 200 or some other appropriate terms. The EPS 200 may include one or more UEs 201, an NG-RAN 202, a 5G-Core Network/Evolved Packet Core (5G-CN/EPC) 210, a Home Subscriber Server (HSS) 220 and an Internet Service 230. The EPS may be interconnected with other access networks. For simple description, the entities/interfaces are not shown. As shown in FIG. 2, the EPS provides packet switching services. Those skilled in the art are easy to understand that various concepts presented throughout the present disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistants (PDAs), Satellite Radios, non-terrestrial base station communications, satellite mobile communications, Global Positioning Systems (GPSs), multimedia devices, video devices, digital audio player (for example, MP3 players), cameras, games consoles, unmanned air-interface vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one subembodiment, the UE 201 corresponds to the UE in the present disclosure.

In one subembodiment, the gNB 203 corresponds to the base station in the present disclosure.

In one subembodiment, the UE 201 supports wireless communication of data transmission on unlicensed spectrums.

In one subembodiment, the gNB 203 supports wireless communication of data transmission on unlicensed spectrums.

In one subembodiment, the UE 201 supports wireless communication based on NOMA.

In one subembodiment, the gNB 203 supports wireless communication based on NOMA.

In one subembodiment, the UE 201 supports grant-free uplink transmission.

In one subembodiment, the gNB 203 supports grant-free uplink transmission.

In one subembodiment, the UE 201 supports contention based uplink transmission.

In one subembodiment, the gNB 203 supports contention based uplink transmission.

Embodiment 3

Figure 3:
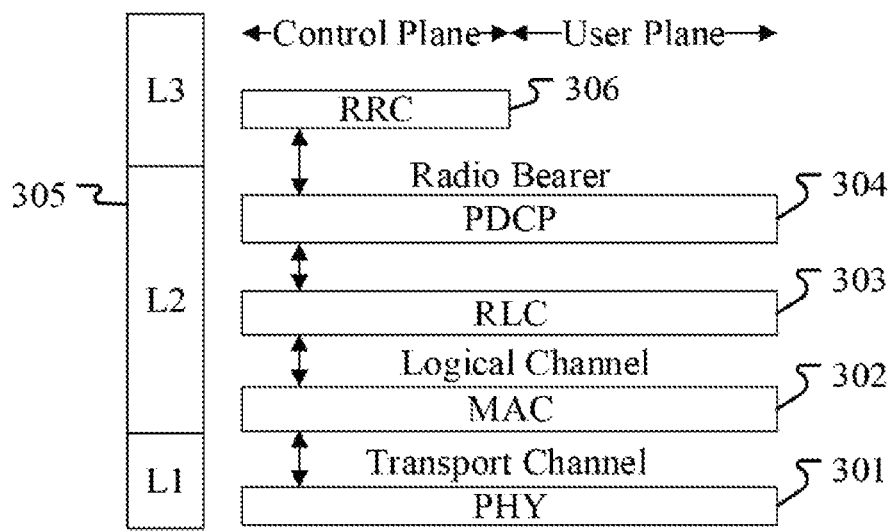
FIG. 3 is a diagram illustrating an embodiment of a radio protocol architecture of a user plane and a control plane according to one embodiment of the present disclosure.

Embodiment 3 illustrates a diagram of an embodiment of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a base station device (gNB or eNB) is represented by three layers, which are a layer 1, a layer 2 and a layer 3 respectively. The layer 1 (L1) is the lowest layer and performs signal processing functions of various PHY layers. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may have several higher layers above the L2 305, including a network layer (i.e. IP layer) terminated at the P-GW of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce the radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the first radio signal in the present disclosure is generated by the PHY 301.

In one subembodiment, the first sub-information in the present disclosure is generated by the PHY 301.

In one subembodiment, the second sub-information in the present disclosure is generated by the PHY 301.

In one subembodiment, the third sub-information in the present disclosure is generated by the PHY 301.

In one subembodiment, the second radio signal in the present disclosure is generated by the PHY 301.

In one subembodiment, the second information in the present disclosure is generated by the RRC sublayer 306.

In one subembodiment, the third information in the present disclosure is generated by the RRC sublayer 306.

Embodiment 4

Figure 4:
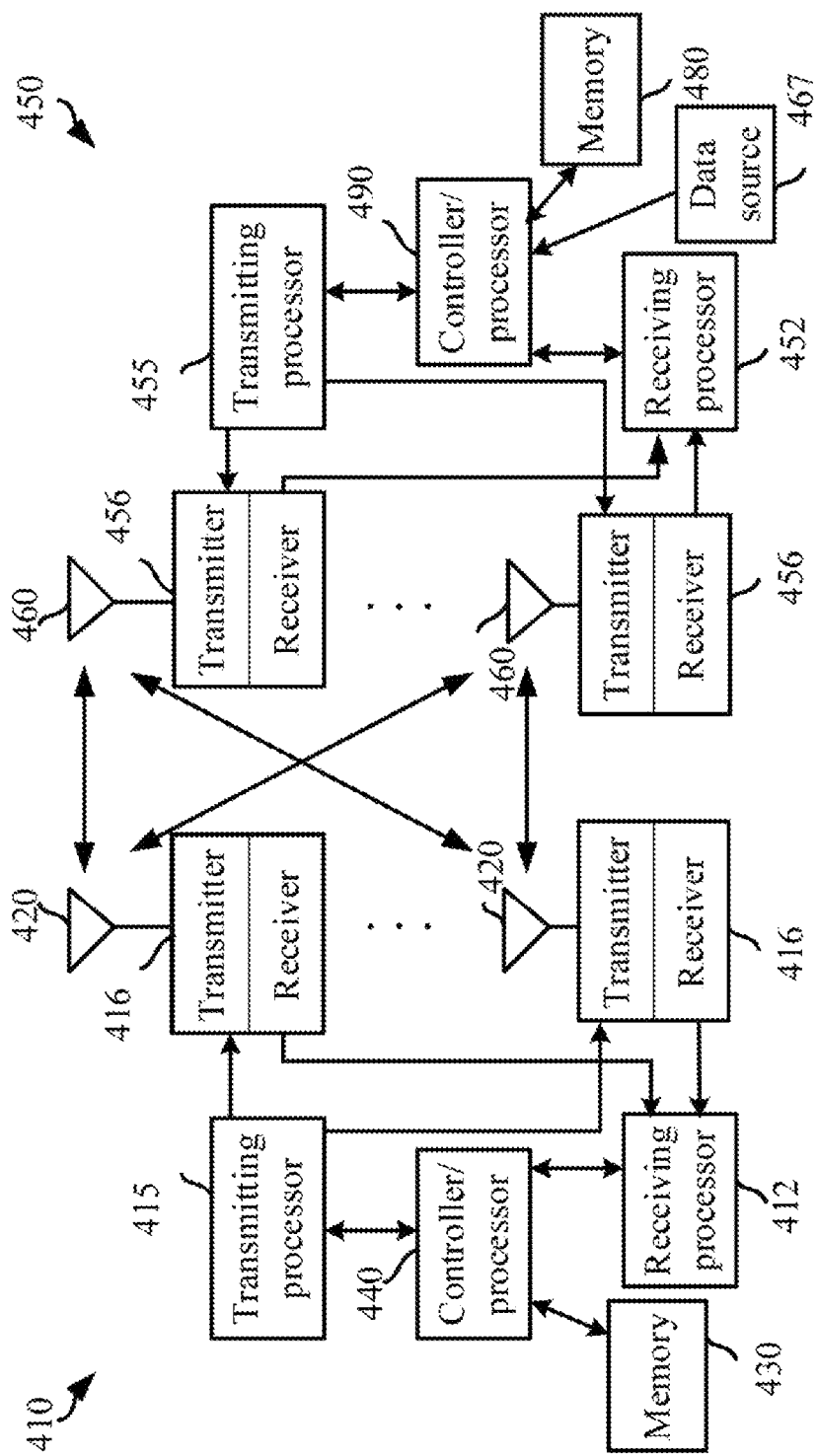
FIG. 4 is a diagram illustrating an evolved node B and a UE according to one embodiment of the present disclosure.

Embodiment 4 illustrates a diagram of a base station and a UE according to the present disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In Uplink (UL) transmission, processes relevant to the base station 410 include the following.

The receiver 416 receives a radio-frequency signal via the corresponding antenna 420, converts the received radio-frequency signal into a baseband signal, and provides the baseband signal to the receiving processor 412.

The receiving processor 412 performs signal receiving processing functions of an L1 layer (that is, PHY), including decoding, de-interleaving, descrambling, demodulation, extraction of physical layer control signaling, etc.

The controller/processor 440 performs functions of an L2 layer, and is connected to the memory 43 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 is then provided to a core network.

The controller/processor 440 determines to monitor a first radio signal in a first air-interface resource, and to generate first information so as to indicate to the UE whether the first radio signal is correctly received.

In UL transmission, processes relevant to the UE 450 include the following.

The data source 467 provides a higher-layer packet to the controller/processor 490. The data source 467 represents all protocol layers above the L2 layer.

The transmitter 456 transmits a radio-frequency signal via the corresponding antenna 460, converts a baseband signal into a radio-frequency signal and provides the radio-frequency signal to the corresponding antenna 460.

The transmitting processor 455 receives a bit stream output from the controller/processor 490, and performs signal transmitting processing functions of an L1 layer (that is, PHY), including encoding, interleaving, scrambling, modulation, power control/allocation, generation of physical layer control signaling (including PRACH, PUCCH, PUSCH, reference signal), etc.

The controller/processor 490 performs header compression, encryption, packet segmentation and reordering, and multiplexing between a logical channel and a transport channel based on the radio resource allocation of the gNB 410, and performs functions of the layer 2 of the user plane and the control plane.

The controller/processor 490 is also in charge of HARQ operation, retransmission of a lost packet, and the signaling to the eNB 410.

The controller/processor 490 determines to transmit a first radio signal in a first air-interface resource, and to determine through first information whether the first radio signal is correctly received.

In one subembodiment, the UE 450 includes at least one processor and at least one memory. The at least one memory includes computer program codes. The at least one memory and the computer program codes are configured to be used in collaboration with the at least one processor. The UE 450 at least transmits a first radio signal in first air-interface resources, and receives first information, the first information including first sub-information and second sub-information; the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the UE 450 includes a memory that stores a computer readable instruction program. The computer readable instruction program generates an action when executed by at least one processor. The action includes: transmitting a first radio signal in first air-interface resources, and receiving first information, the first information including first sub-information and second sub-information; the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the gNB 410 includes at least one processor and at least one memory. The at least one memory includes computer program codes. The at least one memory and the computer program codes are configured to be used in collaboration with the at least one processor. The gNB 410 at least monitors a first radio signal in first air-interface resources, and transmits first information, the first information including first sub-information and second sub-information; the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the gNB 410 includes a memory that stores a computer readable instruction program. The computer readable instruction program generates an action when executed by at least one processor. The action includes: monitoring a first radio signal in first air-interface resources, and transmitting first information, the first information including first sub-information and second sub-information; the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the UE 450 corresponds to the UE in the present disclosure.

In one subembodiment, the gNB 410 corresponds to the base station in the present disclosure.

In one subembodiment, the controller/processor 490 is used for determining to transmit a first radio signal in first air-interface resources and is used for determining, through first information, whether the first radio signal is correctly received.

In one subembodiment, at least the former two of the transmitter 456, the transmitting processor 455, and the controller/processor 490 are used for transmitting a first radio signal in first air-interface resources.

In one subembodiment, at least the former two of the receiver 456, the receiving processor 452, and the controller/processor 490 are used for receiving first information, the first information including first sub-information and second sub-information.

In one subembodiment, at least the former two of the receiver 456, the receiving processor 452, and the controller/processor 490 are used for receiving third sub-information.

In one subembodiment, at least the former two of the transmitter 456, the transmitting processor 455, and the controller/processor 490 are used for transmitting a second radio signal in second air-interface resources.

In one subembodiment, at least the former two of the receiver 456, the receiving processor 452, and the controller/processor 490 are used for receiving second information.

In one subembodiment, at least the former two of the receiver 456, the receiving processor 452, and the controller/processor 490 are used for receiving third information.

In one subembodiment, the controller/processor 440 is used for determining to monitor a first radio signal in first air-interface resources, and to generate first information so as to indicate to the UE 450 whether the first radio signal is correctly received.

In one subembodiment, at least the former two of the receiver 416, the receiving processor 412, and the controller/processor 440 are used for monitoring a first radio signal in first air-interface resources.

In one subembodiment, at least the former two of the transmitter 416, the transmitting processor 415, and the controller/processor 440 are used for transmitting first information, the first information including first sub-information and second sub-information.

In one subembodiment, at least the former two of the transmitter 416, the transmitting processor 415, and the controller/processor 440 are used for transmitting third sub-information.

In one subembodiment, at least the former two of the receiver 416, the receiving processor 412, and the controller/processor 440 are used for monitoring a second radio signal in a second air-interface resource.

In one subembodiment, at least the former two of the transmitter 416, the transmitting processor 415, and the controller/processor 440 are used for transmitting second information.

In one subembodiment, at least the former two of the transmitter 416, the transmitting processor 415, and the controller/processor 440 are used for transmitting third information.

Embodiment 5

Figure 5:
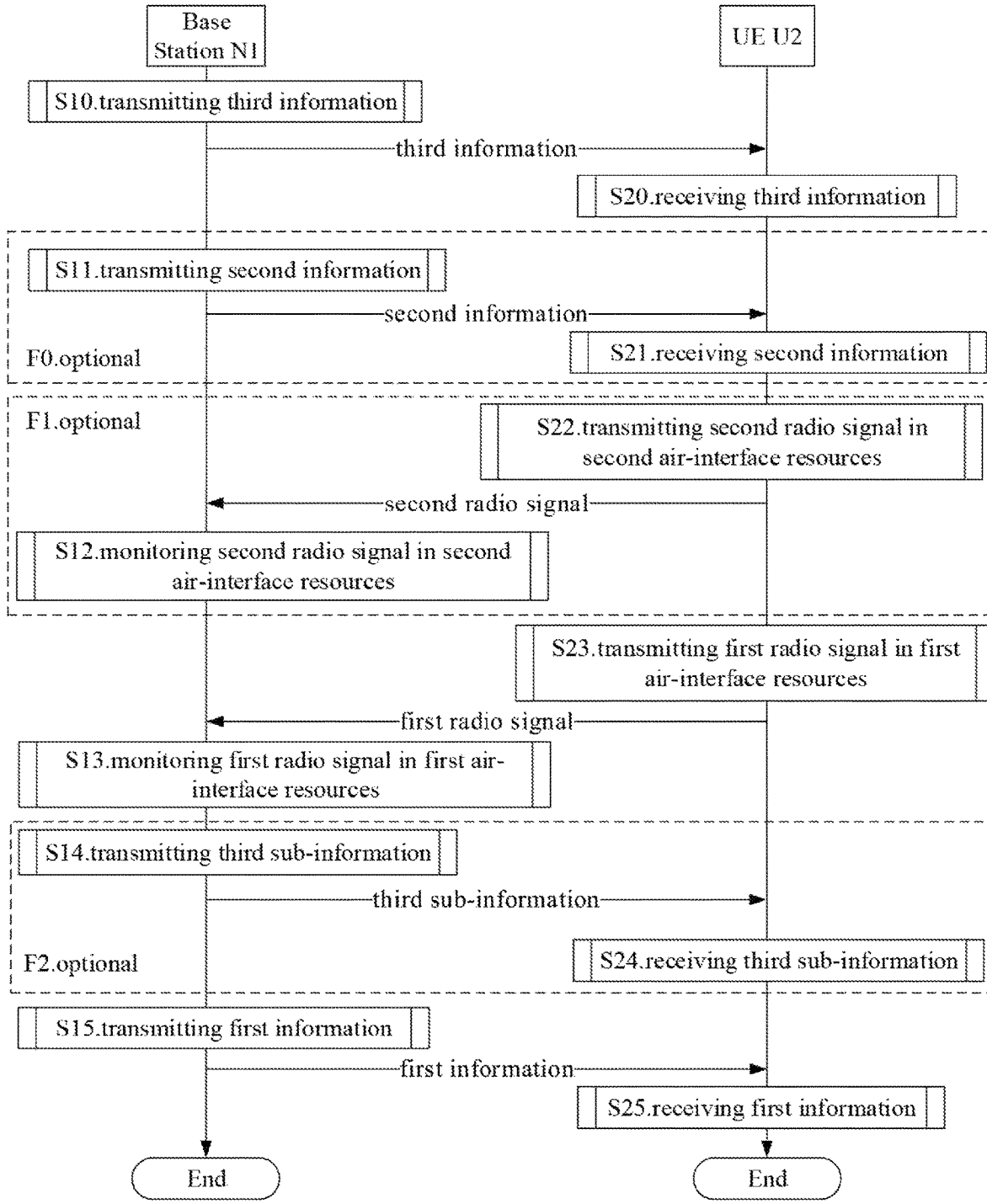
FIG. 5 is a flowchart of first information according to one embodiment of the present disclosure.

Embodiment 5 illustrates an example of a flowchart of a second radio signal, as shown in FIG. 5. In FIG. 5, the base station N1 is a maintenance base station for a serving cell of the UE U2. In FIG. 5, steps in boxes marked by F0, F1, and F2 are optional.

The base station N1 transmits third information in S10, transmits second information in S11, monitors a second radio signal in second air-interface resources in S12, monitors a first radio signal in first air-interface resources in S13, transmits third sub-information in S14, and transmits first information in S15.

The UE U2 receives third information in S20, receive second information in S21, transmits a second radio signal in second air-interface resources in S22, transmits a first radio signal in first air-interface resources in S23, receives third sub-information in S24, and receives first information in S25.

In Embodiment 5, the first information includes first sub-information and second sub-information; the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1; the third sub-information is used for determining a position of the first bit in the first field and a position of the first field in the Q1 fields; the second radio signal is used for indicating a first identification, and the UE corresponds to the first identification; the second information is used for indicating a second air-interface resource pool, the second air-interface resource pool includes K3 second-type air-interface resources, and the first identification is used for determining the second air-interface resource from the second air-interface resource pool; and the third information is used for indicating the first air-interface resource pool.

In one subembodiment, all first-type air-interface resources in the first air-interface resource pool may be divided into a plurality of first-type air-interface resource subpools by any one candidate mode of L candidate modes, and the third sub-information indicates from the L candidate modes one candidate mode which corresponds to the K2 first-type air-interface resource subpools.

In one subembodiment, the L candidate modes all divide out the same number of first-type air-interface resource subpools.

In one subembodiment, at least two candidate modes of the L candidate modes divide out different numbers of first-type air-interface resource subpools.

In one subembodiment, the third sub-information is cell-specific.

In one subembodiment, the third sub-information is dynamically configured.

In one subembodiment, the first sub-information, the second sub-information and the third sub-information all belong to one DCI.

In one subembodiment, the second sub-information and the third sub-information both belong to one DCI, and the first sub-information belongs to another DCI.

In one subembodiment, the first sub-information, the second sub-information and the third sub-information belongs to three DCIs respectively.

In one subembodiment, the third sub-information belongs to a PDCCH, a CRC included in the PDCCH is scrambled through a given RNTI; the given RNTI is cell-specific, or the given RNTI is terminal group-specific, and the UE U2 belongs to the terminal group.

In one subembodiment, the first identification is configured through a higher-layer signaling.

In one subembodiment, the first identification is generated by the UE U2 itself.

In one affiliated embodiment of the above subembodiment, the first identification is a random number generated by the UE U2.

In one subembodiment, the second information is further used for indicating the first identification.

In one subembodiment, any two second-type air-interface resources of the K3 second-type air-interface resources are orthogonal.

In one subembodiment, two second-type air-interface resources are orthogonal only when at least one of the following conditions is met:

the two second-type air-interface resources are non-overlapping in time domain;

the two second-type air-interface resources are non-overlapping in frequency domain; and the two second-type air-interface resources correspond to mutually orthogonal multi-access signatures in code domain.

In one subembodiment, two second-type air-interface resources are orthogonal only when at least one of the following conditions is met:

there is no RE belonging to both the two second-type air-interface resources;

and the two second-type air-interface resources include a third sequence and a fourth sequence in code domain respectively, and the correlation between the third sequence and the fourth sequence is 0.

In one subembodiment, the second radio signal is a DMRS for the first radio signal.

In one subembodiment, the base station N1 performs channel estimation according to the second radio signal, and applies the result of the channel estimation to the demodulation of the first radio signal.

In one subembodiment, the first air-interface resource pool includes K3 first-type air-interface resources, and the K3 first-type air-interface resources are one-to-one corresponding to the K3 second-type air-interface resources respectively.

In one affiliated embodiment of the above subembodiment, any two first-type air-interface resources of the K3 first-type air-interface resources are orthogonal.

In one affiliated embodiment of the above subembodiment, at least two first-type air-interface resources of the K3 first-type air-interface resources are not orthogonal.

In one subembodiment, the second information is transmitted through an RRC signaling.

In one subembodiment, the second information is transmitted via an air interface.

In one subembodiment, the air interface in the present disclosure corresponds to the interface between the UE 201 and the NR node B 203 mentioned in Embodiment 2.

In one subembodiment, the air interface in the present disclosure is carried over a radio channel.

In one subembodiment, the first identification is used for determining the first air-interface resource subpool from the first air-interface resource pool.

In one subembodiment, the first identification is used for determining the first air-interface resource from the first air-interface resource subpool.

In one subembodiment, the third information is further used for indicating the second air-interface resource pool.

In one subembodiment, the third information is transmitted through an RRC signaling.

In one subembodiment, the third information is transmitted via an air interface.

In one subembodiment, the base station N1 blind-detects the first radio signal in the first air-interface resource pool.

In one subembodiment, before monitoring the first radio signal, the base station N1 does not know the position of time domain resources occupied by the first air-interface resources in the first air-interface resource pool.

In one subembodiment, before monitoring the first radio signal, the base station N1 does not know the position of frequency domain resources occupied by the first air-interface resource in the first air-interface resource pool.

In one subembodiment, before monitoring the first radio signal, the base station N1 does not know the position of a code domain resource occupied by the first air-interface resource in the first air-interface resource pool.

In one subembodiment, the base station N1 monitoring the second radio signal in the second air-interfaces resource refers that: the base station N1 determines in the second air-interface resource pool the second air-interface resources through a blind detection manner, and receives the second radio signal on the second air-interface resources.

In one affiliated embodiment of the above subembodiment, the blind detection is an energy detection.

In one affiliated embodiment of the above subembodiment, the blind detection is a signature sequence detection.

In one affiliated embodiment of the above subembodiment, the blind detection is a correlation detection.

Embodiment 6

Figure 6:
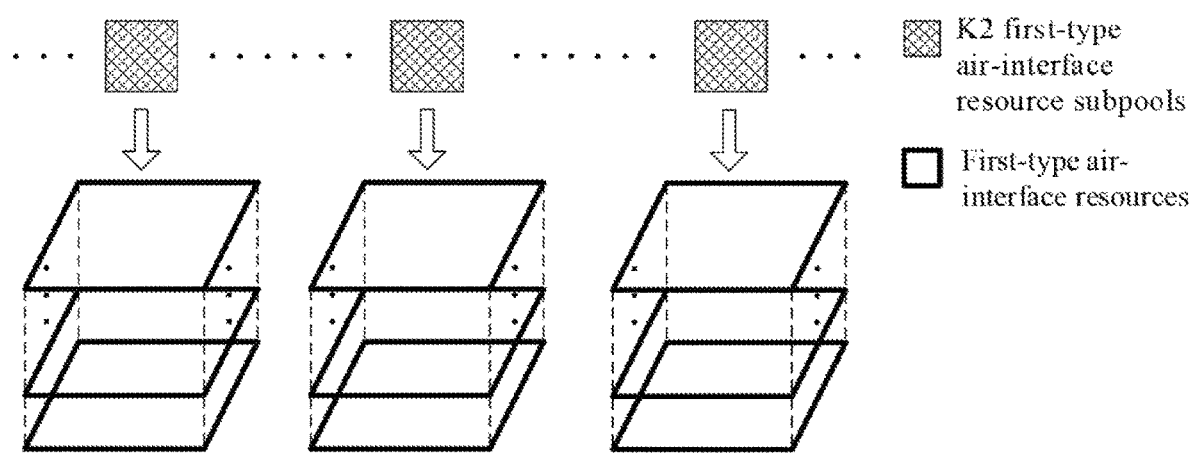
FIG. 6 is a diagram illustrating a first air-interface resource pool according to one embodiment of the present disclosure.

Embodiment 6 illustrates an example of a diagram of a first air-interface resource pool, as shown in FIG. 6. In FIG. 6, the first air-interface resource pool includes K2 first-type air-interface resource subpools, and any one first-type air-interface resource subpool of the K2 first-type air-interface resource subpools includes K1 first-type air-interface resources; the first air-interface resource subpool in the present disclosure is a first-type air-interface resource subpool of the K2 first-type air-interface resource subpools which includes the first air-interface resources in the present disclosure.

In one subembodiment, any one first-type air-interface resources included in the first air-interface resource pool occupy a positive integer number of consecutive multicarrier symbols in time domain, and occupies a positive integer number of consecutive subcarriers in frequency domain.

In one subembodiment, time-frequency resources occupied by any two first-type air-interface resource subpools of the K2 first-type air-interface resource subpools are orthogonal.

In one subembodiment, a given first-type air-interface resource subpool is any one of the K2 first-type air-interface resource subpools, the given first-type air-interface resource subpool includes K1 given first-type air-interface resources, and the K1 given first-type air-interface resources correspond to K1 orthogonal code domain resources respectively.

In one subembodiment, a given first-type air-interface resource subpool is any one of the K2 first-type air-interface resource subpools, the given first-type air-interface resource subpool includes K1 given first-type air-interface resources, and the K1 given first-type air-interface resources correspond to K1 different multi-access signatures respectively.

Embodiment 7

Figure 7:
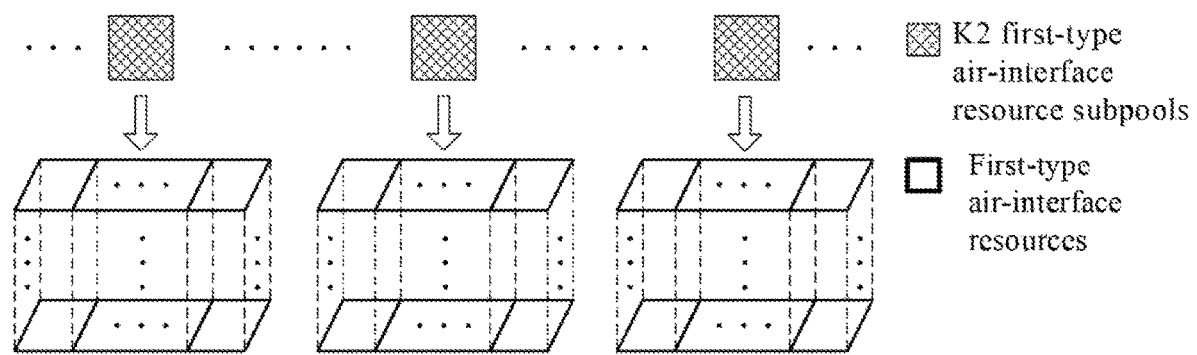
FIG. 7 is a diagram illustrating a first air-interface resource pool according to another embodiment of the present disclosure.

Embodiment 7 illustrates an example of a diagram of another first air-interface resource pool, as shown in FIG. 7. In FIG. 7, the first air-interface resource pool includes K2 first-type air-interface resource subpools, and any one first-type air-interface resource subpool of the K2 first-type air-interface resource subpools includes K1 first-type air-interface resources; the first air-interface resource subpool in the present disclosure is a first-type air-interface resource subpool of the K2 first-type air-interface resource subpools which includes the first air-interface resources in the present disclosure.

In one subembodiment, any one first-type air-interface resources included in the first air-interface resource pool occupy a positive integer number of consecutive multicarrier symbols in time domain, and occupy a positive integer number of consecutive subcarriers in frequency domain.

In one subembodiment, time-frequency resources occupied by any two first-type air-interface resource subpools of the K2 first-type air-interface resource subpools are orthogonal.

In one subembodiment, a given first-type air-interface resource subpool is any one of the K2 first-type air-interface resource subpools, the given first-type air-interface resource subpool includes K1 given first-type air-interface resources, and the K1 given first-type air-interface resources correspond to K1 orthogonal time-frequency-code domain resources respectively.

In one subembodiment, the first air-interface resource pool includes K3 first-type air-interface resources, the K3 first-type air-interface resources include at least first target air-interface resources and second target air-interface resources, the first target air-interface resources and the second target air-interface resources occupy the same time-frequency resources, and the first target air-interface resources and the second target air-interface resources are non-orthogonal in code domain.

Embodiment 8

Figure 8:
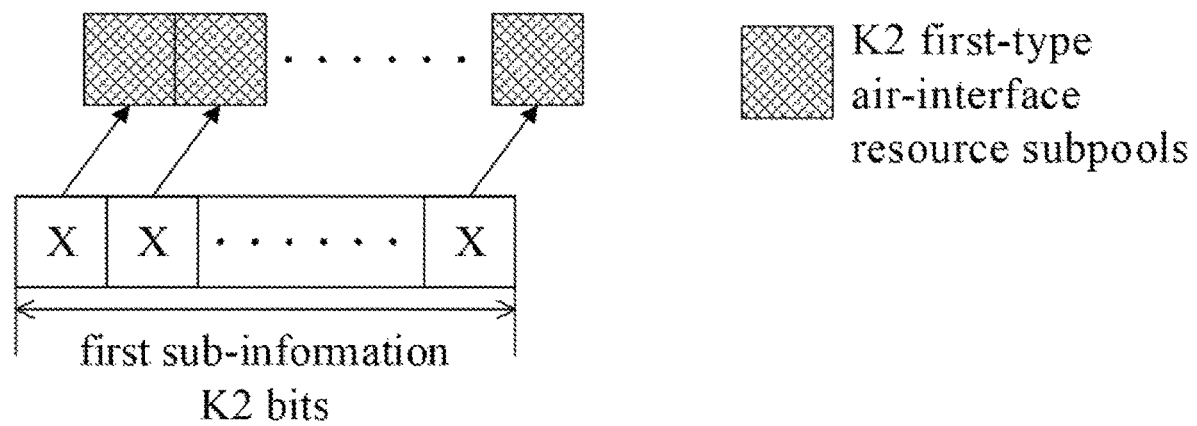
FIG. 8 is a diagram illustrating first sub-information according to one embodiment of the present disclosure.

Embodiment 8 illustrates an example of a diagram of first sub-information, as shown in FIG. 8. In FIG. 8, the first sub-information includes K2 bits, and the K2 bits correspond to K2 first-type air-interface resource subpools respectively. An "X" shown in FIG. 8 corresponds to one bit of the K2 bits.

In one subembodiment, a given bit is any one of the K2 bits, and the given bit is corresponding to a given first-type air-interface resource subpool; if the given bit is equal to "1", it is indicated that the base station detects an uplink transmission in at least one of the first-type air-interface resources included in the given first-type air-interface resource subpool; if the given bit is equal to "0", it is indicated that the base station does not detect an uplink transmission in any one of the first-type air-interface resources included in the given first-type air-interface resource subpool.

In one affiliated embodiment of the above subembodiment, the blind detection is an energy detection.

In one affiliated embodiment of the above subembodiment, the blind detection is a correlation detection.

In one affiliated embodiment of the above subembodiment, the blind detection is a CRC check based detection.

In one affiliated embodiment of the above subembodiment, the blind detection is a signature sequence detection.

In one subembodiment, the K2 bits include Q1 1s, the second sub-information in the present disclosure includes Q1 fields, and the Q1 fields are one-to-one corresponding to the Q1 first-type air-interface resource subpools corresponding to the Q1 1s respectively.

Embodiment 9

Figure 9:
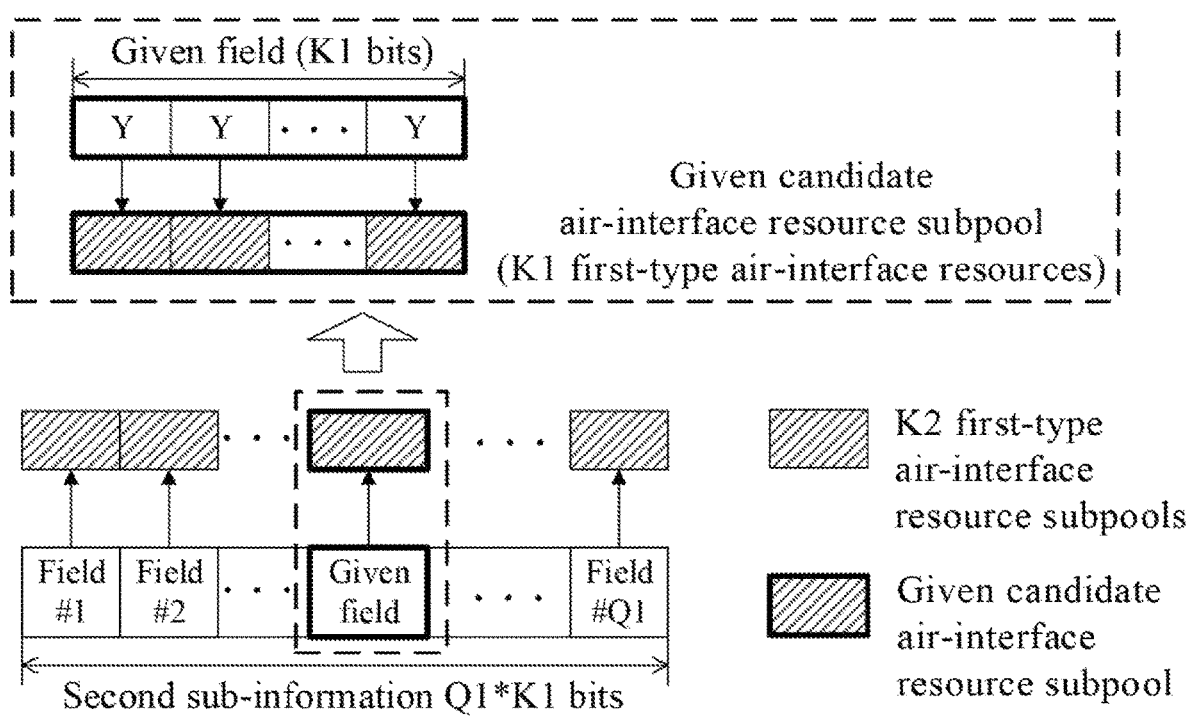
FIG. 9 is a diagram illustrating second sub-information according to one embodiment of the present disclosure.

Embodiment 9 illustrates an example of a diagram of second sub-information, as shown in FIG. 9. In FIG. 9, the second sub-information includes Q1 fields, the first sub-information in the present disclosure includes Q1 1s, the Q1 fields are one-to-one corresponding to the Q1 is respectively, the Q1 fields are one-to-one corresponding to Q1 candidate air-interface resource subpools respectively, and the Q1 candidate air-interface resource subpools belong to the K2 first-type air-interface resource subpools in the present disclosure; fields #1 to #Q1 shown in FIG. 9 correspond to the Q1 fields respectively; a "Y" shown in FIG. 9 corresponds to a bit in a given field, the given field is any one field of the Q1 fields, the given field is corresponding to a given candidate air-interface resource subpool, and the given candidate air-interface resource subpool belongs to the Q1 candidate air-interface resource subpools.

In one subembodiment, the Q1 1s included in the first sub-information are used for indicating the Q1 candidate air-interface resource subpools respectively, and the base station in the present disclosure detects uplink transmissions on all of the Q1 candidate air-interface resource subpools.

In one subembodiment, the given candidate air-interface resource subpool includes K1 first-type air-interface resources, the given field includes K1 bits, and the K1 bits are used for determining whether transmissions on the K1 first-type air-interface resources included in the given candidate air-interface resource subpool are correctly received, respectively.

In one subembodiment, the number of bits included in the second sub-information is equal to an arithmetic product of the Q1 and the K1.

In one subembodiment, the number of bits included in the second sub-information is related to the number of is included in the first sub-information.

Embodiment 10

Figure 10:
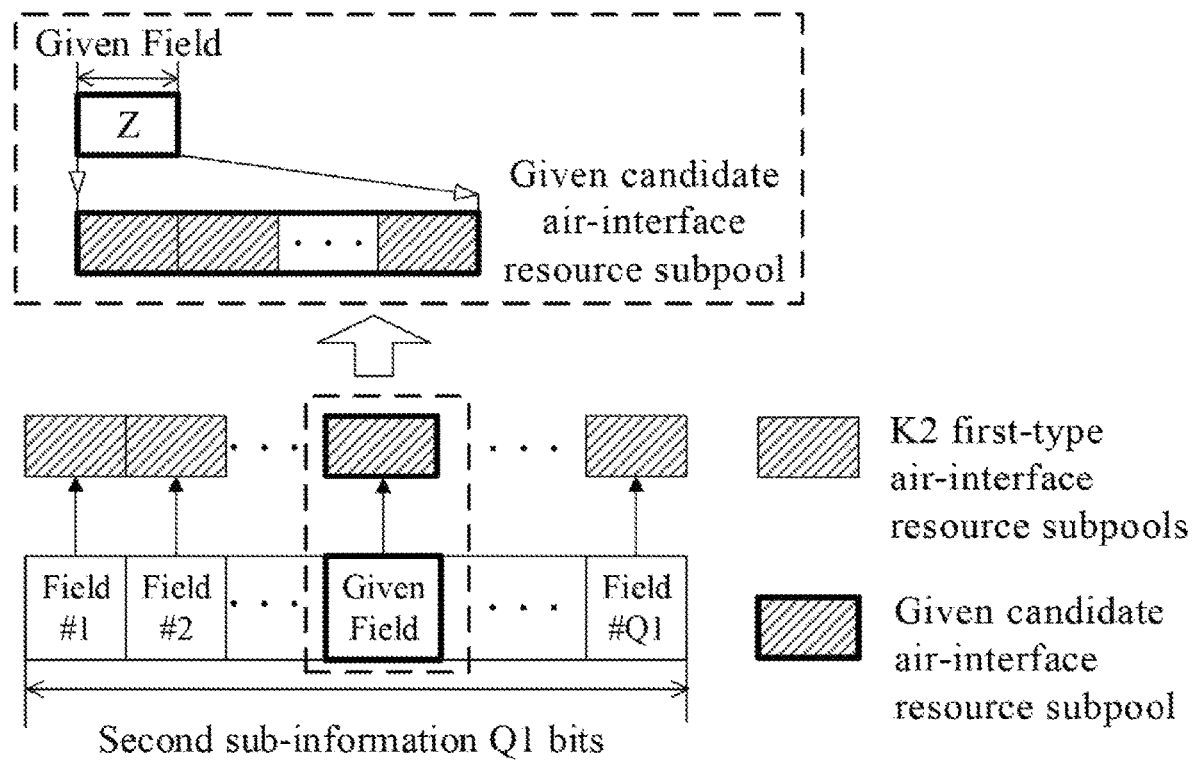
FIG. 10 is a diagram illustrating second sub-information according to another embodiment of the present disclosure.

Embodiment 10 illustrates an example of a diagram of another second sub-information, as shown in FIG. 10. In FIG. 10, the second sub-information includes Q1 fields, the first sub-information in the present disclosure includes Q1 1s, the Q1 fields are one-to-one corresponding to the Q1 1s respectively, the Q1 fields are one-to-one corresponding to Q1 candidate air-interface resource subpools respectively, and the Q1 candidate air-interface resource subpools belong to the K2 first-type air-interface resource subpools in the present disclosure; fields #1 to #Q1 shown in FIG. 9 correspond to the Q1 fields respectively; each field of the Q1 fields includes one bit only, a "Z" shown in FIG. 10 corresponds to the one bit included in a given field, the given field is any one field of the Q1 fields, the given field is corresponding to a given candidate air-interface resource subpool, and the given candidate air-interface resource subpool belongs to the Q1 candidate air-interface resource subpools.

In one subembodiment, the second sub-information includes Q1 bits only, the Q1 bits correspond to the Q1 fields respectively, a target bit is any one of the Q1 bits, the target bit is corresponding to a target candidate air-interface resource subpool, and the target candidate air-interface resource subpool belongs to the Q1 candidate air-interface resource subpools.

In one affiliated embodiment of the above subembodiment, the Q1 is equal to the K2, and the Q1 candidate air-interface resource subpools correspond to the K2 first-type air-interface resource subpools respectively.

In one affiliated embodiment of the above subembodiment, the target candidate air-interface resource subpool includes K1 first-type air-interface resources; and the target bit is equal to 1, indicating that uplink transmissions on the K1 first-type air-interface resources included in the target candidate air-interface resource subpool are all correctly received.

In one affiliated embodiment of the above subembodiment, the target candidate air-interface resource subpool includes K1 first-type air-interface resources; and the target bit is equal to 0, indicating that an uplink transmission on at least one first-type air-interface resource of the K1 first-type air-interface resources included in the target candidate air-interface resource subpool is not correctly received.

Embodiment 11

Figure 11:
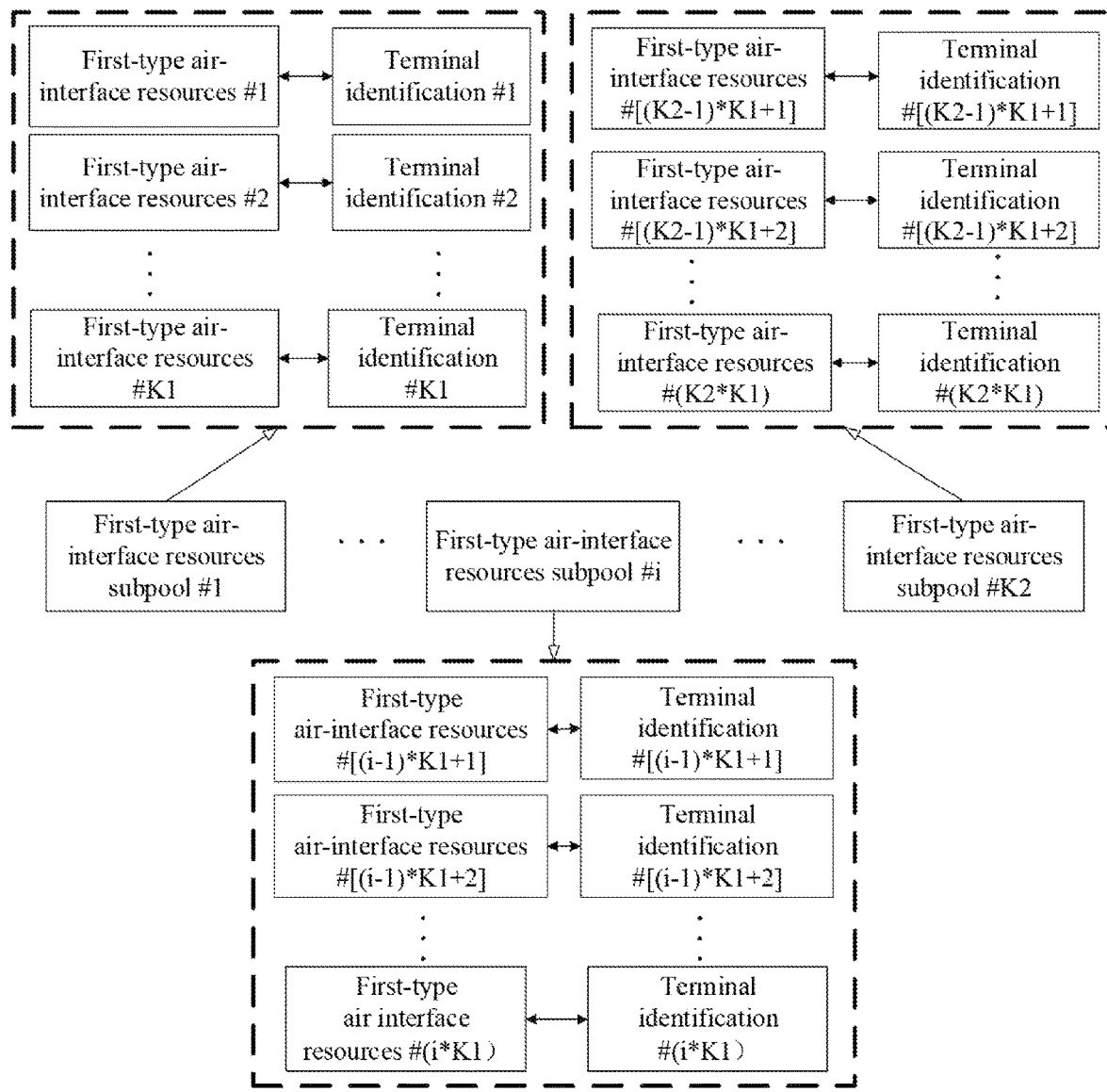
FIG. 11 is a diagram illustrating a division approach of a first air-interface resource pool according to one embodiment of the present disclosure.

Embodiment 11 illustrates an example of a diagram of a division approach of a first air-interface resource pool, as shown in FIG. 11. All first-type air-interface resources in the first air-interface resource pool in the present disclosure may be divided into a plurality of first-type air-interface resource subpools by any one candidate mode of L candidate modes, and the third sub-information indicates from the L candidate modes one candidate mode which corresponds to the K2 first-type air-interface resource subpools. FIG. 11 illustrates one of the L candidate modes. The first air-interface resource pool is capable of supporting K3 UEs to perform uplink transmissions simultaneously, the K3 UEs occupy K3 first-type air-interface resources included in the first air-interface resource pool respectively, and the K3 first-type air-interface resources correspond to K3 terminal identifications respectively; the K3 first-type air-interface resources are divided into K2 first-type air-interface resource subpools according to the approach shown in FIG. 11, corresponding to a first-type air-interface resource subpool #1 to a first-type air-interface resource subpool #K2 shown in FIG. 11 respectively. The i shown in FIG. 11 is a positive integer greater than 1 but less than K2. The identification of the UE in the present disclosure corresponds to one of the K3 terminal identifications. The K3 is an arithmetic product of the K1 and the K2.

In one subembodiment, the third sub-information includes R bits, the R is a positive integer, and 2 to the Rth power is not less than the L.

In one subembodiment, the identification corresponding to the UE is a terminal identification #[(i−1)*K1+1], the first field in the present disclosure corresponds to the first-type air-interface resource subpool #i, and the first bit in the present disclosure corresponds to the second bit in the first field.

Embodiment 12

Figure 12:
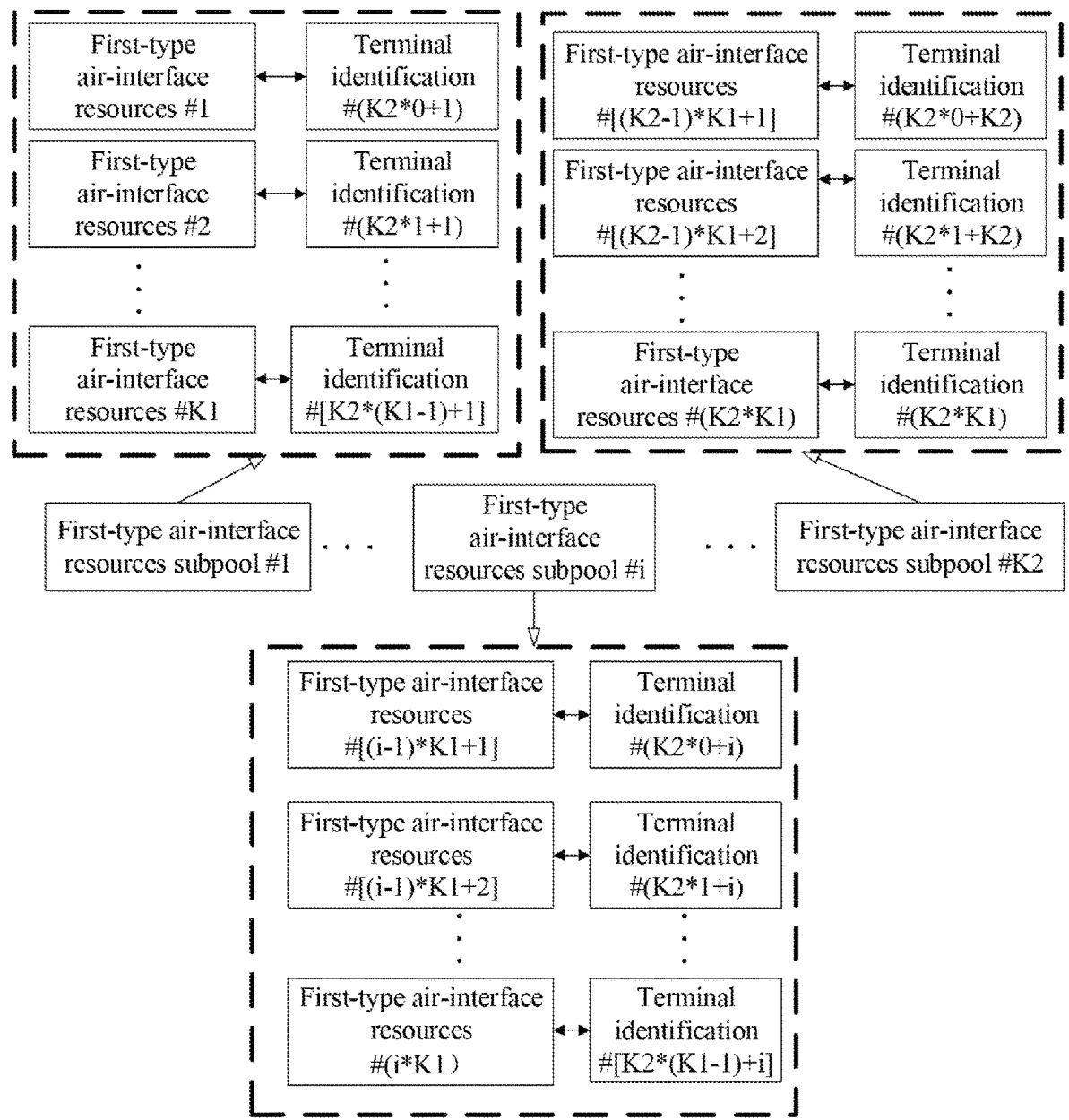
FIG. 12 is a diagram illustrating a division approach of a first air-interface resource pool according to another embodiment of the present disclosure.

Embodiment 12 illustrates an example of a diagram of a division approach of a first air-interface resource pool, as shown in FIG. 12. All first-type air-interface resources in the first air-interface resource pool in the present disclosure may be divided into a plurality of first-type air-interface resource subpools by any one candidate mode of L candidate modes, and the third sub-information indicates from the L candidate modes one candidate mode which corresponds to the K2 first-type air-interface resource subpools. FIG. 12 illustrates one other candidate mode of the L candidate modes which is different from that in Embodiment 11. The first air-interface resource pool is capable of supporting K3 UEs to perform uplink transmissions simultaneously, the K3 UEs occupy K3 first-type air-interface resources included in the first air-interface resource pool respectively, and the K3 first-type air-interface resources correspond to K3 terminal identifications respectively; the K3 first-type air-interface resources are divided into K2 first-type air-interface resource subpools according to the approach shown in FIG. 12, corresponding to a first-type air-interface resource subpool #1 to a first-type air-interface resource subpool #K2 shown in FIG. 12 respectively. The i shown in FIG. 12 is a positive integer greater than 1 but less than K2. The identification of the UE in the present disclosure corresponds to one of the K3 terminal identifications. The K3 is an arithmetic product of the K1 and the K2.

In one subembodiment, the third sub-information includes R bits, the R is a positive integer, and 2 to the Rth power is not less than the L.

In one subembodiment, the identification corresponding to the UE is a terminal identification #(K2*1+i), the first field in the present disclosure corresponds to the first-type air-interface resource subpool #i, and the first bit in the present disclosure corresponds to the second bit in the first field.

Embodiment 13

Figure 13:
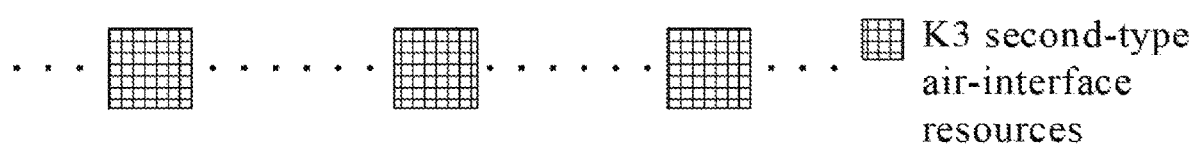
FIG. 13 is a diagram illustrating a second air-interface resource pool according to one embodiment of the present disclosure.

Embodiment 13 illustrates an example of a diagram of a second air-interface resource pool, as shown in FIG. 13. In FIG. 13, the second air-interface resource pool includes K3 second-type air-interface resources.

In one subembodiment, given second-type air-interface resources are any one of the K3 second-type air-interface resources, the given second-type air-interface resources occupy a positive integer number of subcarriers in frequency domain and occupies a positive integer number of multicarrier symbols in time domain.

In one subembodiment, the first air-interface resource pool includes K3 first-type air-interface resources, and the K3 second-type air-interface resources are one-to-one corresponding to the K3 first-type air-interface resources.

In one subembodiment, any two second-type air-interface resources of the K3 second-type air-interface resources are orthogonal.

Embodiment 14

Figure 14:
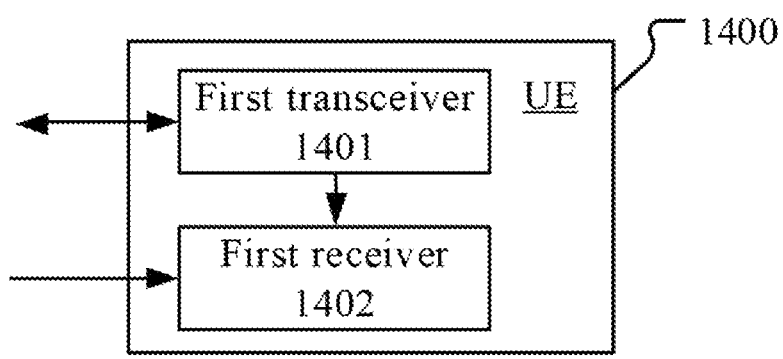
FIG. 14 is a structure block diagram illustrating a processing device in a UE according to one embodiment of the present disclosure.

Embodiment 14 illustrates an example of a structure block diagram of a processing device in a UE, as shown in FIG. 14. In FIG. 14, the processing device 1400 of the UE includes a first transceiver 1401 and a first receiver 1402.

The first transceiver 1401 transmits a first radio signal in first air-interface resources.

The first receiver 1402 receives first information, the first information including first sub-information and second sub-information.

In Embodiment 14, the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the first receiver 1402 further receives third sub-information; and the third sub-information is used for determining a position of the first bit in the first field and a position of the first field in the Q1 fields.

In one subembodiment, the first transceiver 1401 further transmits a second radio signal in a second air-interface resource; and the second radio signal is used for indicating a first identification, and the UE corresponds to the first identification.

In one subembodiment, the first transceiver 1401 further receives second information; and the second information is used for indicating a second air-interface resource pool, the second air-interface resource pool includes K3 second-type air-interface resources, and the first identification is used for determining the second air-interface resource from the second air-interface resource pool.

In one subembodiment, the first transceiver 1401 further receives third information; and the third information is used for indicating the first air-interface resource pool.

In one subembodiment, the first transceiver 1401 includes at least the former four of the receiver/transmitter 456, the receiving processor 452, the transmitting processor 455, and the controller/processor 490.

In one subembodiment, the receiver 1402 includes at least the former two of the receiver 456, the receiving processor 452, and the controller/processor 490.

Embodiment 15

Figure 15:
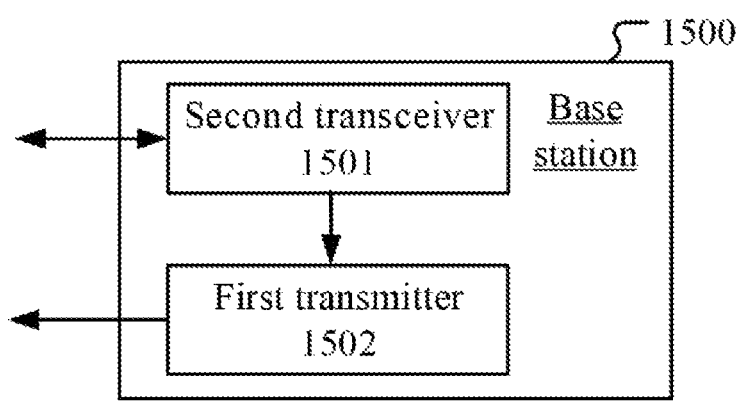
FIG. 15 is a structure block diagram illustrating a processing device in a base station according to one embodiment of the present disclosure.

Embodiment 15 illustrates an example of a structure block diagram of a processing device in a base station, as shown in FIG. 15. In FIG. 15, the processing device 1500 of the base station includes a second transceiver 1501 and a first transmitter 1502.

The second transceiver 1501 monitors a first radio signal in first air-interface resources.

The first transmitter 1502 transmits first information, the first information including first sub-information and second sub-information.

In Embodiment 15, the first air-interface resources are first-type air-interface resources in a first air-interface resource subpool, and the first air-interface resource subpool is a first-type air-interface resource subpool in a first air-interface resource pool; the first air-interface resource subpool includes K1 first-type air-interface resources, and the first air-interface resource pool includes K2 first-type air-interface resource subpools; the second sub-information includes Q1 fields, the Q1 fields are one-to-one corresponding to Q1 first-type air-interface resource subpools of the K2 first-type air-interface resource subpools, and each field of the Q1 fields is reserved to indicate whether a bit block transmitted in a corresponding first-type air-interface resource subpool is correctly received; a first field is a field of the Q1 fields which is corresponding to the first air-interface resource subpool, a first bit is a bit in the first field, the first bit is used for indicating whether a first bit block is correctly received, and the first bit block is used for generating the first radio signal; the first sub-information is used for indicating the Q1 first-type air-interface resource subpools from the K2 first-type air-interface resource subpools; the K1 and the K2 are positive integers respectively, and the Q1 is a positive integer not greater than the K1.

In one subembodiment, the first transmitter 1502 further transmits third sub-information; and the third sub-information is used for determining a position of the first bit in the first field and a position of the first field in the Q1 fields.

In one subembodiment, the second transceiver 1501 further monitors a second radio signal in second air-interface resources; and the second radio signal is used for indicating a first identification, and the UE corresponds to the first identification.

In one subembodiment, the second transceiver 1501 further transmits second information; and the second information is used for indicating a second air-interface resource pool, the second air-interface resource pool includes K3 second-type air-interface resources, and the first identification is used for determining the second air-interface resource from the second air-interface resource pool.

In one subembodiment, the second transceiver 1501 further transmits third information; and the third information is used for indicating the first air-interface resource pool.

In one subembodiment, the second transceiver 1501 includes at least the former four of the receiver/transmitter 416, the transmitting processor 415, the receiving processor 412, and the controller/processor 440.

In one subembodiment, the first transmitter 1502 includes at least the former two of the transmitter 416, the transmitting processor 415, and the controller/processor 440.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned air-interface vehicles, communication modules on unmanned air-interface vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base stations, gNBs (NR nodes B), TRPs, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   transmitting a first radio signal in a first aerial resource; and
   receiving first information, the first information comprising first sub-information and second sub-information;
   wherein the first aerial resource is a first-type aerial resource in a first aerial resource subpool, and the first aerial resource subpool is a first-type aerial resource subpool in a first aerial resource pool; the first aerial resource subpool comprises K1 first-type aerial resources, and the first aerial resource pool comprises K2 first-type aerial resource subpools; the second sub-information comprises Q1 fields, the Q1 fields are one-to-one corresponding to Q1 first-type aerial resource subpools of the K2 first-type aerial resource subpools, and each field of the Q1 fields is reserved to indicate whether a bit block transmitted in a corresponding first-type aerial resource subpool is correctly received; a first field is a field of the Q1 fields which is corresponding to the first aerial resource subpool, a first bit is a bit in the first field, the first bit is used for indicating whether a first bit block is correctly received, and the first bit block is used for generating the first radio signal; the first sub-information is used for indicating the Q1 first-type aerial resource subpools from the K2 first-type aerial resource subpools; the K1 and the K2 are positive integers respectively, and the Q1 is a positive integer not greater than the K1.

2. The method according to claim 1, comprising:
   receiving third sub-information;
   wherein the third sub-information is used for determining a position of the first bit in the first field and a position of the first field in the Q1 fields.

3. The method according to claim 1, comprising:
   transmitting a second radio signal in a second aerial resource;
   wherein the second radio signal is used for indicating a first identification, and the UE corresponds to the first identification.

4. The method according to claim 3, comprising:
   receiving second information;

wherein the second information is used for indicating a second aerial resource pool, the second aerial resource pool comprises K3 second-type aerial resources, and the first identification is used for determining the second aerial resource from the second aerial resource pool; K3 is a positive integer greater than 1.

5. The method according to claim 1, comprising:
receiving third information;
wherein the third information is used for indicating the first aerial resource pool.

6. A method in a base station for wireless communication, comprising:
monitoring a first radio signal in a first aerial resource; and
transmitting first information, the first information comprising first sub-information and second sub-information;
wherein the first aerial resource is a first-type aerial resource in a first aerial resource subpool, and the first aerial resource subpool is a first-type aerial resource subpool in a first aerial resource pool; the first aerial resource subpool comprises K1 first-type aerial resources, and the first aerial resource pool comprises K2 first-type aerial resource subpools; the second sub-information comprises Q1 fields, the Q1 fields are one-to-one corresponding to Q1 first-type aerial resource subpools of the K2 first-type aerial resource subpools, and each field of the Q1 fields is reserved to indicate whether a bit block transmitted in a corresponding first-type aerial resource subpool is correctly received; a first field is a field of the Q1 fields which is corresponding to the first aerial resource subpool, a first bit is a bit in the first field, the first bit is used for indicating whether a first bit block is correctly received, and the first bit block is used for generating the first radio signal; the first sub-information is used for indicating the Q1 first-type aerial resource subpools from the K2 first-type aerial resource subpools; the K1 and the K2 are positive integers respectively, and the Q1 is a positive integer not greater than the K1.

7. The method according to claim 6, comprising:
transmitting third sub-information;
wherein the third sub-information is used for determining a position of the first bit in the first field and a position of the first field in the Q1 fields.

8. The method according to claim 6, comprising:
monitoring a second radio signal in a second aerial resource;
wherein the second radio signal is used for indicating a first identification, and a transmitting end of the first radio signal corresponds to the first identification.

9. The method according to claim 8, comprising:
transmitting second information;
wherein the second information is used for indicating a second aerial resource pool, the second aerial resource pool comprises K3 second-type aerial resources, and the first identification is used for determining the second aerial resource from the second aerial resource pool; K3 is a positive integer greater than 1.

10. The method according to claim 6, comprising:
transmitting third information;
wherein the third information is used for indicating the first aerial resource pool.

11. A UE for wireless communication, comprising:
a first transceiver, to transmit a first radio signal in a first aerial resource; and
a first receiver, to receive first information, the first information comprising first sub-information and second sub-information;
wherein the first aerial resource is a first-type aerial resource in a first aerial resource subpool, and the first aerial resource subpool is a first-type aerial resource subpool in a first aerial resource pool; the first aerial resource subpool comprises K1 first-type aerial resources, and the first aerial resource pool comprises K2 first-type aerial resource subpools; the second sub-information comprises Q1 fields, the Q1 fields are one-to-one corresponding to Q1 first-type aerial resource subpools of the K2 first-type aerial resource subpools, and each field of the Q1 fields is reserved to indicate whether a bit block transmitted in a corresponding first-type aerial resource subpool is correctly received; a first field is a field of the Q1 fields which is corresponding to the first aerial resource subpool, a first bit is a bit in the first field, the first bit is used for indicating whether a first bit block is correctly received, and the first bit block is used for generating the first radio signal; the first sub-information is used for indicating the Q1 first-type aerial resource subpools from the K2 first-type aerial resource subpools; the K1 and the K2 are positive integers respectively, and the Q1 is a positive integer not greater than the K1.

12. The UE according to claim 11, wherein the first receiver further receives third sub-information; and the third sub-information is used for determining a position of the first bit in the first field and a position of the first field in the Q1 fields.

13. The UE according to claim 11, wherein the first transceiver further transmits a second radio signal in a second aerial resource; and the second radio signal is used for indicating a first identification, and the UE corresponds to the first identification.

14. The UE according to claim 13, wherein the first transceiver further receives second information; and the second information is used for indicating a second aerial resource pool, the second aerial resource pool comprises K3 second-type aerial resources, and the first identification is used for determining the second aerial resource from the second aerial resource pool; K3 is a positive integer greater than 1.

15. The UE according to claim 11, wherein the first transceiver further receives third information; and the third information is used for indicating the first aerial resource pool.

16. A base station device for wireless communication, comprising:
a second transceiver, to monitor a first radio signal in a first aerial resource; and
a first transmitter, to transmit first information, the first information comprising first sub-information and second sub-information;
wherein the first aerial resource is a first-type aerial resource in a first aerial resource subpool, and the first aerial resource subpool is a first-type aerial resource subpool in a first aerial resource pool; the first aerial resource subpool comprises K1 first-type aerial resources, and the first aerial resource pool comprises K2 first-type aerial resource subpools; the second sub-information comprises Q1 fields, the Q1 fields are one-to-one corresponding to Q1 first-type aerial resource subpools of the K2 first-type aerial resource subpools, and each field of the Q1 fields is reserved to indicate whether a bit block transmitted in a corresponding first-type aerial resource subpool is correctly received; a first field is a field of the Q1 fields which is corresponding to the first aerial resource subpool, a first bit is a bit in the first field, the first bit is used for indicating whether a first bit block is correctly received, and the first bit block is used for generating the first radio signal; the first sub-information is used for indicating the Q1 first-type aerial resource subpools from the K2 first-type aerial resource subpools; the K1 and the K2 are positive integers respectively, and the Q1 is a positive integer not greater than the K1.

17. The base station device according to claim 16, wherein the first transmitter further transmits third sub-information; and the third sub-information is used for determining a position of the first bit in the first field and a position of the first field in the Q1 fields.

18. The base station device according to claim 16, wherein the second transceiver further monitors a second radio signal in a second aerial resource; and the second radio signal is used for indicating a first identification, and the UE corresponds to the first identification.

19. The base station device according to claim 18, wherein the second transceiver further transmits second information; and the second information is used for indicating a second aerial resource pool, the second aerial resource pool comprises K3 second-type aerial resources, and the first identification is used for determining the second aerial resource from the second aerial resource pool; K3 is a positive integer greater than 1.

20. The base station device according to claim 16, wherein the second transceiver further transmits third information; and the third information is used for indicating the first aerial resource pool.

* * * * *